United States Patent [19]

Nakagawa et al.

[11] Patent Number: 4,922,420

[45] Date of Patent: May 1, 1990

[54] VIDEO GAME SOFTWARE SELECTION DATA PROCESSING SYSTEM

[75] Inventors: Katsuya Nakagawa; Kunihiro Tanaka; Masayuki Yukawa; Masaki Nomura, all of Kyoto, Japan

[73] Assignee: Nintendo Company Limited, Kyoto, Japan

[21] Appl. No.: 76,792

[22] Filed: Jul. 23, 1987

[30] Foreign Application Priority Data

Jul. 23, 1986 [JP] Japan .................................. 61-173372
Oct. 30, 1986 [JP] Japan .................................. 61-167400

[51] Int. Cl.$^5$ ...................... G06F 12/06; G06F 15/44; A63F 9/22; G07F 17/32
[52] U.S. Cl. .................................. 364/410; 273/148 B
[58] Field of Search ............ 273/1 E, 85 G, DIG. 28, 273/148 B; 364/410

[56] References Cited

U.S. PATENT DOCUMENTS

| | | | |
|---|---|---|---|
| 4,194,198 | 3/1980 | Baer et al. | 273/DIG. 28 X |
| 4,296,930 | 10/1981 | Frederiksen | 364/410 X |
| 4,350,997 | 9/1982 | Yamada | 358/78 |
| 4,363,485 | 12/1982 | Edwall | 273/121 A |
| 4,467,424 | 8/1984 | Hedges et al. | 364/412 |
| 4,475,172 | 10/1984 | Frederiksen | 364/900 |
| 4,494,197 | 1/1985 | Troy et al. | 364/412 |
| 4,497,036 | 1/1985 | Dunn | 364/708 |
| 4,516,777 | 5/1985 | Nikora | 273/148 B |
| 4,524,968 | 6/1985 | Dölp | 273/2 |
| 4,593,376 | 6/1986 | Volk | 273/148 B X |
| 4,596,390 | 6/1986 | Studley | 273/148 B |
| 4,630,821 | 12/1986 | Greenwald | 273/148 B X |
| 4,635,048 | 1/1987 | Nishi et al. | 340/703 |
| 4,718,667 | 1/1988 | Shoemaker, Jr. | 273/1 GC |
| 4,722,053 | 1/1988 | Dubno et al. | 364/410 |
| 4,738,451 | 4/1988 | Logg | 273/153 R |

FOREIGN PATENT DOCUMENTS 2163929A 3/1986 United Kingdom .

OTHER PUBLICATIONS

GAMELINE ® advertisement, Control Video Corp., appearing in *Electronic Games,* Jul. 1983.

*Primary Examiner*—Clark A. Jablon
*Attorney, Agent, or Firm*—Nixon & Vanderhye

[57] ABSTRACT

A game software service system is connected to a monitor to display an image for game. A CPU and a PPU which cooperates with the CPU are accommodated within a housing. A plurality of storage mediums which respectively store game programs are attached to the housing in an attachable/detachable manner. The respective storage mediums are commonly connected to an address bus and a data bus of the CPU and the PPU, and assigned with a common address space. A first controller is used for playing a game. Any one of the storage mediums is selected by operation of a second controller. When a menu showing a plurality of game names is displayed on the monitor, accesses from the CPU and the PPU to a selected storage medium are enabled in response to the operation of the second controller. The CPU and the PPU execute a program of the selected storage medium to display the image for game on the monitor. In that state, when the first controller is operated, displaying condition on the monitor screen is responsibly changed by the CPU and the PPU.

14 Claims, 13 Drawing Sheets

FIG. 5
FIG. 6
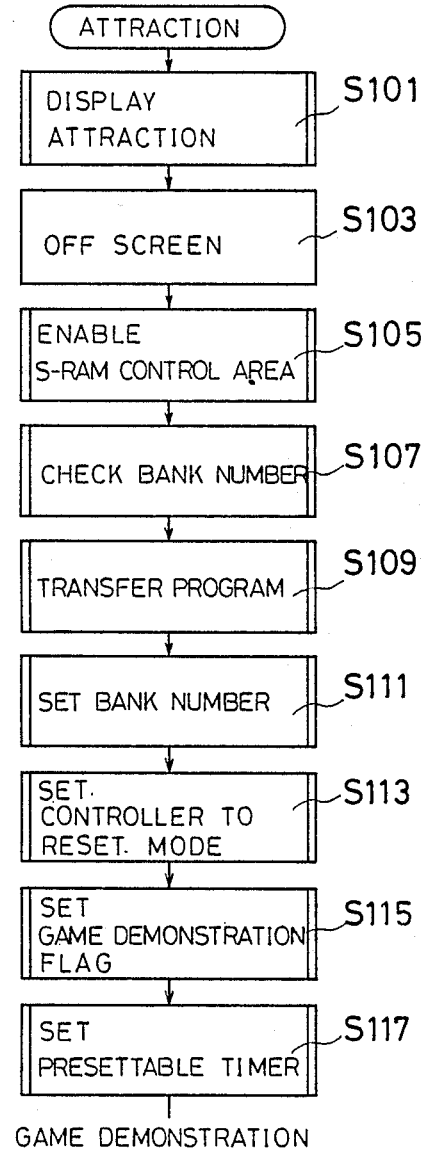
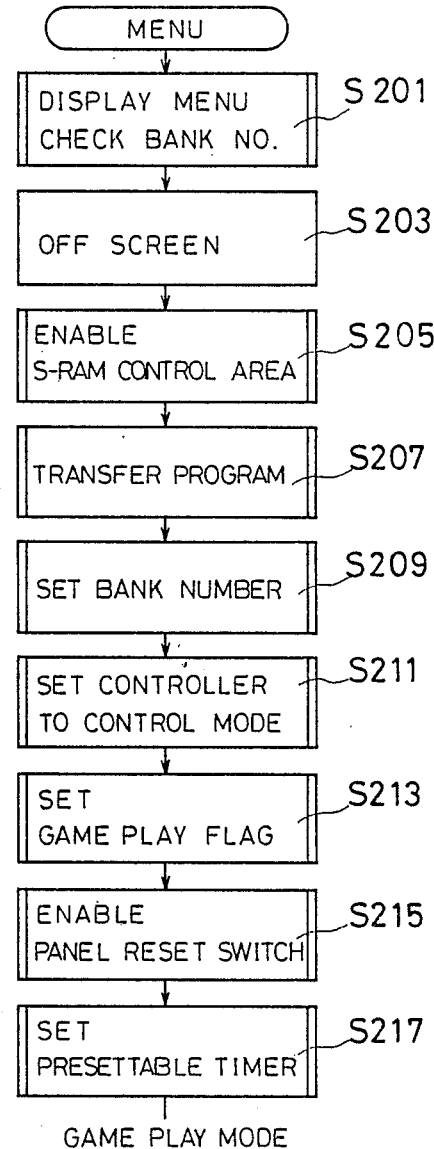

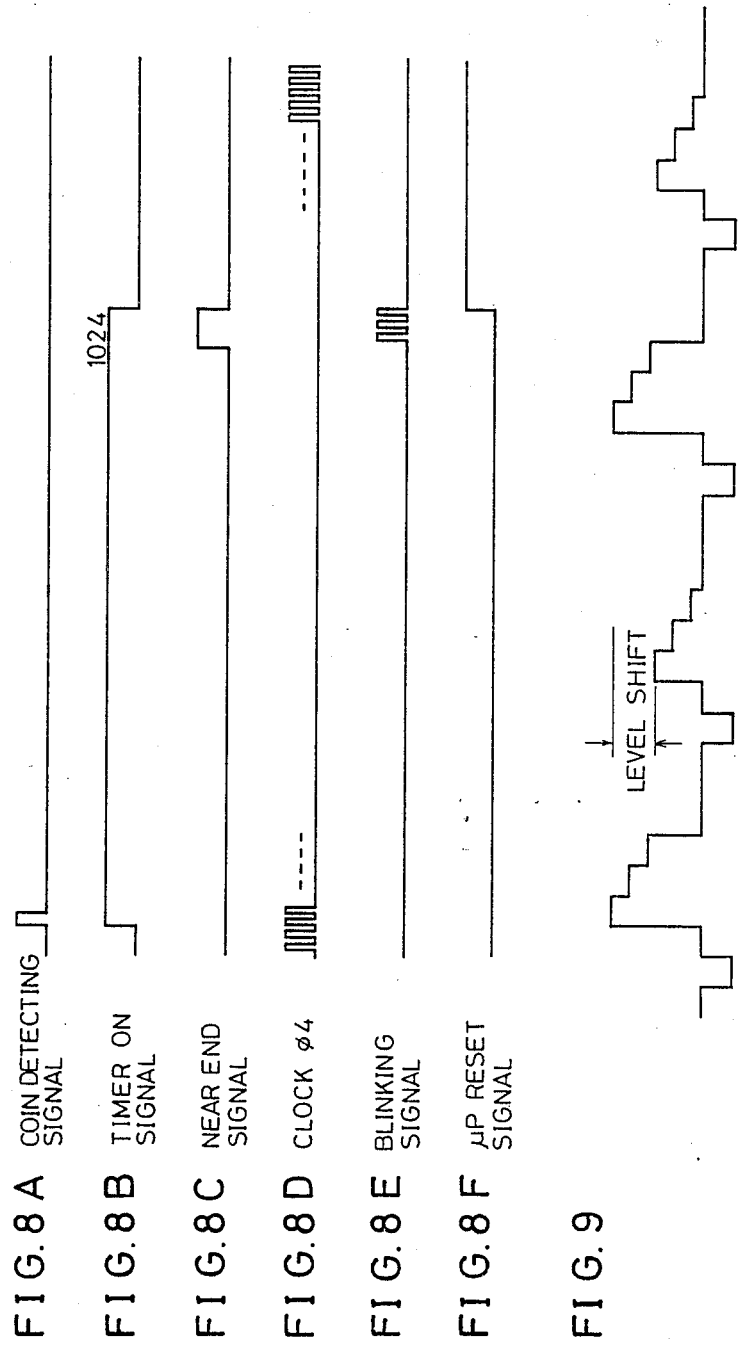

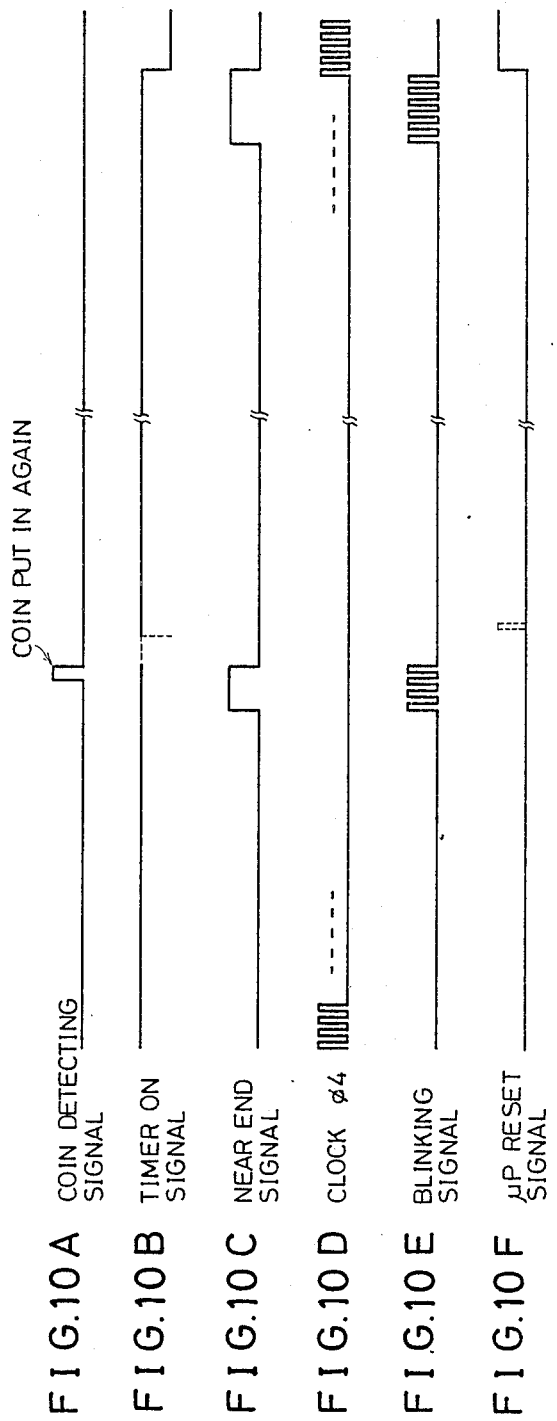

VIDEO GAME SOFTWARE SELECTION DATA PROCESSING SYSTEM

BACKGROUND OF THE INVENTION

1. Field of the Invention

The present invention relates to a game software service system. More specifically, the present invention relates to a novel game software service system wherein a game can be played by arbitrarily selecting any one of a plurality of game programs which are stored in memory cartridges respectively.

2. Description of the Prior Art

No game software service system capable of selectively utilizing any one of a plurality of game programs without interchanging a the cartridge has not been put in use so far.

However, the simplest idea of realizing such a system would be to use that like a so-called juke-box type system wherein, a game cartridge is selected by an arm moving in response to an operation of the operator, and the selected game cartridge is inserted into a predetermined connector. However, loading and unloading of the game cartridge by such an arm not only complicates greatly the configuration, but also increases troubles caused by repetition of loading and unloading of the game cartridge.

A second possible idea is to load a plurality of game cartridges in a fixed fashion in corresponding connectors or slots respectively. In such a system, a slot would be enabled selectively by a mechanical switch, for example, a rotary switch or a push switch.

However, the configuration as described above has such problems that the configuration for switching over the slots (connectors) having a large number of pins corresponding to pins of the game cartridge not only becomes very complicated, but also whether or not the game cartridge is loaded in the slot or whether or not the game cartridge is authentic even if it is loaded cannot be confirmed.

SUMMARY OF THE INVENTION

Therefore, the principal object of the present invention is to provide a novel game software service system capable of selection of a plurality of game programs without interchange of storage mediums.

To be brief, a game software service system in accordance with the present invention is used by connecting to a monitor so as to display images for games on the monitor, and comprises a housing, processing means installed in the housing for controlling displaying images for games and the whole system, a plurality of storage media for games which store different kinds of programs for games respectively and whereto an address space of the processing means is commonly allocated, first operating means for playing the game by operation of the player, second operating means for selecting anyone of a plurality of storage media for games by operation of the player, and enabling means installed in the housing for enabling an access from the processing means to any one of a plurality of storage media for games which are commonly connected to an address bus and a data bus of the processing means in accordance with a selection by the first operating means, wherein the processing means executes one program of the storage medium for game enabled by the enabling means to display the images for game on the monitor, and changes the state of display in accordance with an operation of the second operating means.

When a controller is operated to select the game software, a menu showing respective game programs of the storage media loaded in the slots is displayed on the screen of the monitor connected thereto. When a game software displayed in that menu is selected by the second operating means such as a controller, the game by that selected game software is made playable by the enabling means.

In accordance with the present invention, quite a novel game software service system which can utilize selectively an arbitrary one of a plurality of game programs is obtainable.

Also, in the present invention, the game software can be selected in an electronic manner by operating, for example, a controller used for the game, and therefore not only the configuration is simplified greatly in comparison with the case of utilizing a mechanical switch or the like, but also chances of troubles are reduced to a large extent because of using no mechanical movable parts or contacts.

Furthermore, a plurality of storage media storing different kinds of game programs are allocated to the same address space as viewed from the processing means (CPU or PPU) and any one of them is enabled selectively, and therefore an arbitrary one can be selected from among a large number of game programs without expanding the address space accessible by the processing means.

In one embodiment, when coins are put in, timer means is operated and a time count is started, and a game image is displayed on the screen of the monitor. When the residual time determined according to the amount of money of the coins put in becomes short, the level of luminance of the game image on the screen of the monitor is varied by varying means, and the screen blinks. This variation in the level of luminance, that is, blinking notices the player in advance that the playing time allowed by the put-in coins will soon expire.

In accordance with this embodiment, a previous notice of the game end can be made to the player by variation in the luminance (blinking) on the screen of the monitor by the varying means. Accordingly, the deficiency that the gaming machine is stopped suddenly despite that the game is under playing can be avoided unlike the conventional coin-operated video gaming machine.

Then, when the player puts in additional coins or puts in coins again, the variation in the level of the luminance on the screen by the varying means is stopped. Then, the player can further continue to play the game according to the number of coins or amount of money put in again.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 4A, FIG. 4B, FIG. 5 and FIG. 6 are flow charts showing operations of the embodiment.

FIGS. 8A through 8F are waveform graphs of signals at respective parts showing operations of FIG. 7 embodiment.

FIG. 9 is a waveform graph schematically showing variation in the level of luminance by a level shifter.

FIGS. 10A through 10F are waveform graphs of signals at respective parts showing operations of FIG. 7 embodiment in a different case.

DESCRIPTION OF THE PREFERRED EMBODIMENTS

Figure 1:
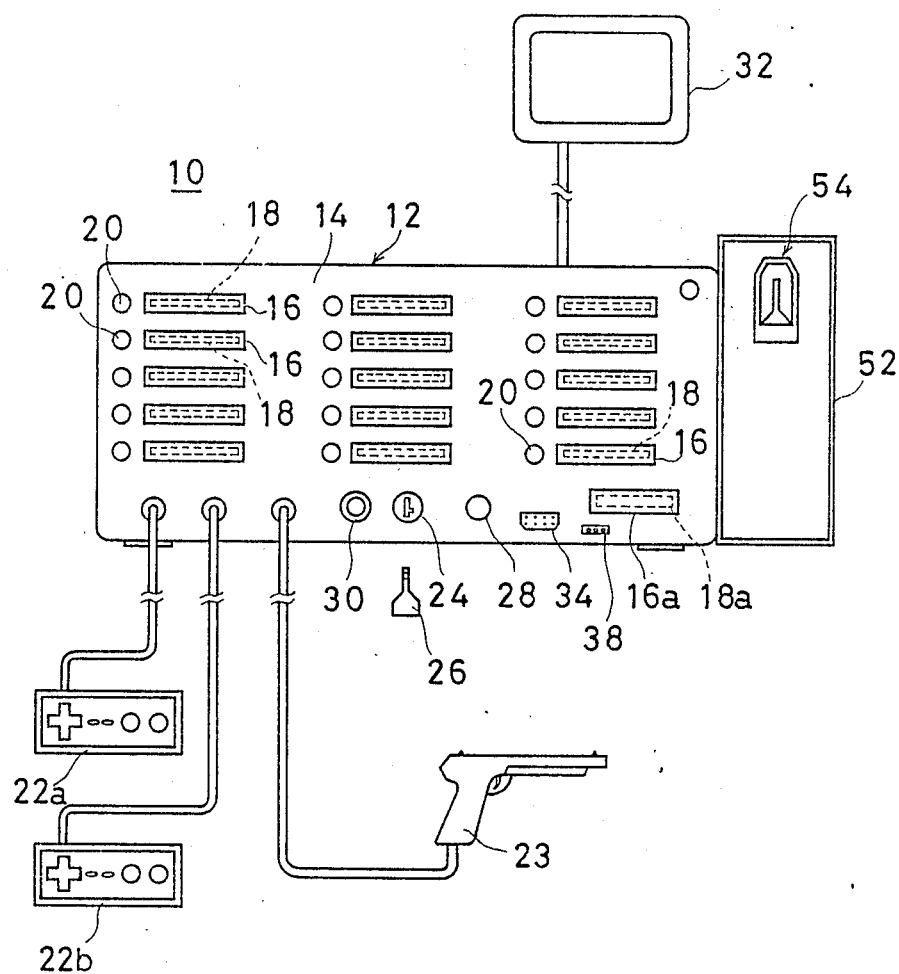
FIG. 1 is a front appearance view showing one embodiment in accordance with the present invention.

FIG. 1 is an appearance view showing one embodiment in accordance with the present invention. A game software service system 10 comprises a cubic main unit 12, and a front panel 14 is formed in the front portion of the main unit 12. A plurality of (15 in this embodiment) slots 16 are formed in the front panel 14, and although not illustrated a multi-pin connector connected to pins of a game cartridge 18 is installed in the inner part of each of these slots 16. Accordingly, these slots 16 can load the game cartridges 18 in an attachable/detachable manner by the multi-pin connectors. Then, in the vicinity of each slot, a light emitting diode (LED) 20 is installed, which is for displaying that the game cartridge 18 is loaded in the slot 16, or whether or not the loaded game cartridge 18 is being utilized.

Controllers 22a and 22b which play the game and are utilized to select the game cartridge 18 loaded in each slot 16 and also a light gun 23 for playing shooting game are connected to the front panel 14.

Further a key switch 24 for selecting whether the game is to be abled or to be disabled is installed on the front panel 14, and the key switch 24 is made operable by inserting a key 26. Accordingly, in the case where such a game software service system 10 is installed, for example, in the guest room of a hotel or the like, the key 26 will be lent out to the user at the front of the hotel in exchange for the charge for utilization.

Also, on the front panel 14, a reset switch 28 and a TV/game change-over switch 30 are installed in the vicinity of the key switch 24. The reset switch 28 is used to reset the game when the user plays the game. The TV/game changeover switch 30 is a switch for changeover between reception of normal television broad casting by a TV receiver 32 utilized as a monitor and display of the game images or CATV images utilizing the TV receiver 32.

Further an expansion connector 34 is installed on the front panel 14, and the expansion connector 34 has functions equivalent to those of the expansion connector of the existing Family Computer (trademark) or Nintendo Entertainment System (trademark) manufactured and sold by the applicant of the present invention, being utilized, for example, for connecting a joy stick controller.

Another slot 16a is installed in the main unit 12, and a monitor memory pack 18a having a system program is stored in the slot 16a. The memory pack 18a may be of the same shape as those of the game cartridges 18 loaded in the other slots 16, and performs control of the whole system, for example, controls displays of the demonstration image, the menu image or the like, selection of the game software, connection to the CATV line, and charging money put in the coin box.

A dip switch 38 is further installed in the main unit 12. The dip switch 38 is constituted as eight bits, and can be utilized for changing over the money charging system, setting unit time of timer according to the unit amount of money of coins to be put in, and so on.

Figure 2:
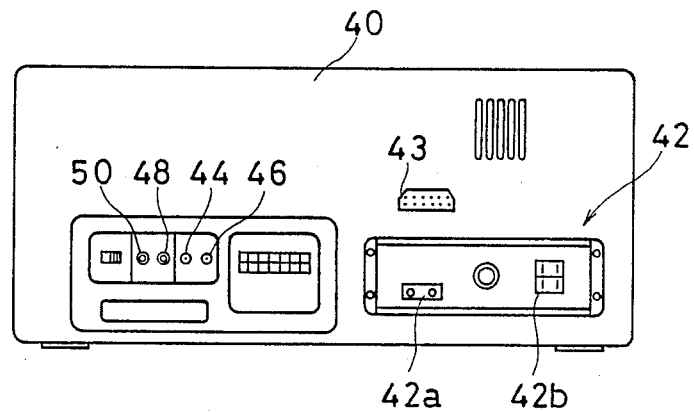
FIG. 2 is a rear appearance view of the embodiment.

As shown in FIG. 2, a power supply unit 42 is installed on a rear panel 40 of the game software service system 10, and the power supply unit 42 is constituted so as to be attachable to and detachable from the rear panel 40 and thus the main unit 12.

In the power supply unit 42, an AC input connector 42a for connecting an AC power supply and an AC output connector 42b for supplying other equipment, for example, the TV receiver 32 for monitoring (FIG. 1) with power are installed. Furthermore, an expansion I/O connector 43 is installed on the rear panel 40. The expansion I/O connector 43 is utilized as an input/output port when a MODEM or the like is connected.

On the rear panel 40, further an output terminal 44 which can be connected to a video input terminal (not illustrated) of the monitor or the TV receiver 32 and an audio output terminal 46 which can be connected to an audio input terminal (not illustrated) of the TV receiver 32 are installed. In the case where such a TV receiver 32 does not have those video input terminal and audio input terminal, a RF output terminal 48 is connected to an antenna terminal thereof (not illustrated). Further, on the rear panel 40, an antenna input terminal 50 for connecting an antenna cable to the system 10 is installed. F-connector plugs are utilized for these terminals 48 and 50, respectively.

Reverting to FIG. 1, a coin box 52 which is one of money charging systems is installed in this system 10, and a coin inlet 54 for putting in coins is formed on the coin box 52. Accordingly, the system of this embodiment can be constituted also as a coin-timer controlling system capable of playing the game for the time according to the amount of money of the coins put in the coin box 52.

Figure 3:
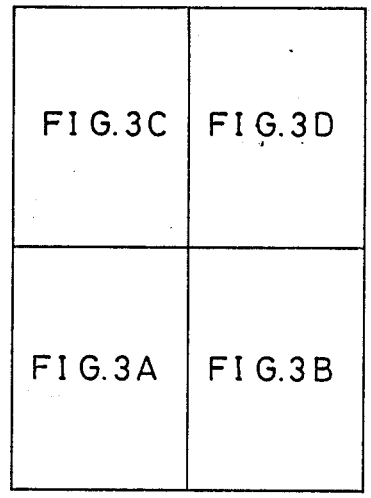
FIGS. 3, 3A, 3B, 3C and 3D are block diagrams showing a configuration of the embodiment.

FIG. 3 is a block diagram showing a configuration of this embodiment. In reference to FIG. 3A, the game software service system 10 comprises a microprocessor or CPU 60. For this CPU 60, for example, the integrated circuit "2A03" manufactured by Nintendo can be utilized. A PPU (Picture Processing Unit) 62 is connected to the CPU 60, and for this PPU 62, like the Family Computer (trademark) or Nintendo Entertainment System (trademark), the integrated circuit "2C02" manufactured by Nintendo can be utilized. Details of the CPU 60 and the PPU 62 are shown in U.S. application Ser. No. 14,150, now U.S. Pat. No. 4,824,106. A clock of, for example, 21.48 MHz is given to the CPU 60 and the PPU 62 from a common oscillator 64.

An eight-bit data bus 68 is connected to the data port of the CPU 60 through a two-way buffer 66, and a 16-bit bus 72 is connected to the address port through a one-way buffer 70. Likewise, the data port of the PPU 62 is connected to an eight-bit data bus 76 through a two-way buffer 74, and the address port is connected to a six-bit address bus 80 through a one-way buffer 78. Furthermore, an address latching circuit 79 is installed in the data port of the PPU 62, and the address latching circuit 79 latches address data outputted in a time shared manner from the data port of the PPU 62, giving the same to the one-way buffer 78 as 14-bit address data along with six bits from the address port of the PPU 62. The address data from the CPU 60 outputted through the address bus 72 is given to an address decoder 82. This system is constituted by the so-called memory map system, and accordingly, the address decoder 82 decodes a five-bit address from the CPU 60, outputting required chip enable signals CE0–CE8, respectively. Also, a system clock φ2 from the CPU 60 is given to the address decoder 82, being given also to another address decoder 84. Likewise, the address decoder 84 also outputs required chip enable signals CE9–CE11 from four-bit address data.

Figure 3A:
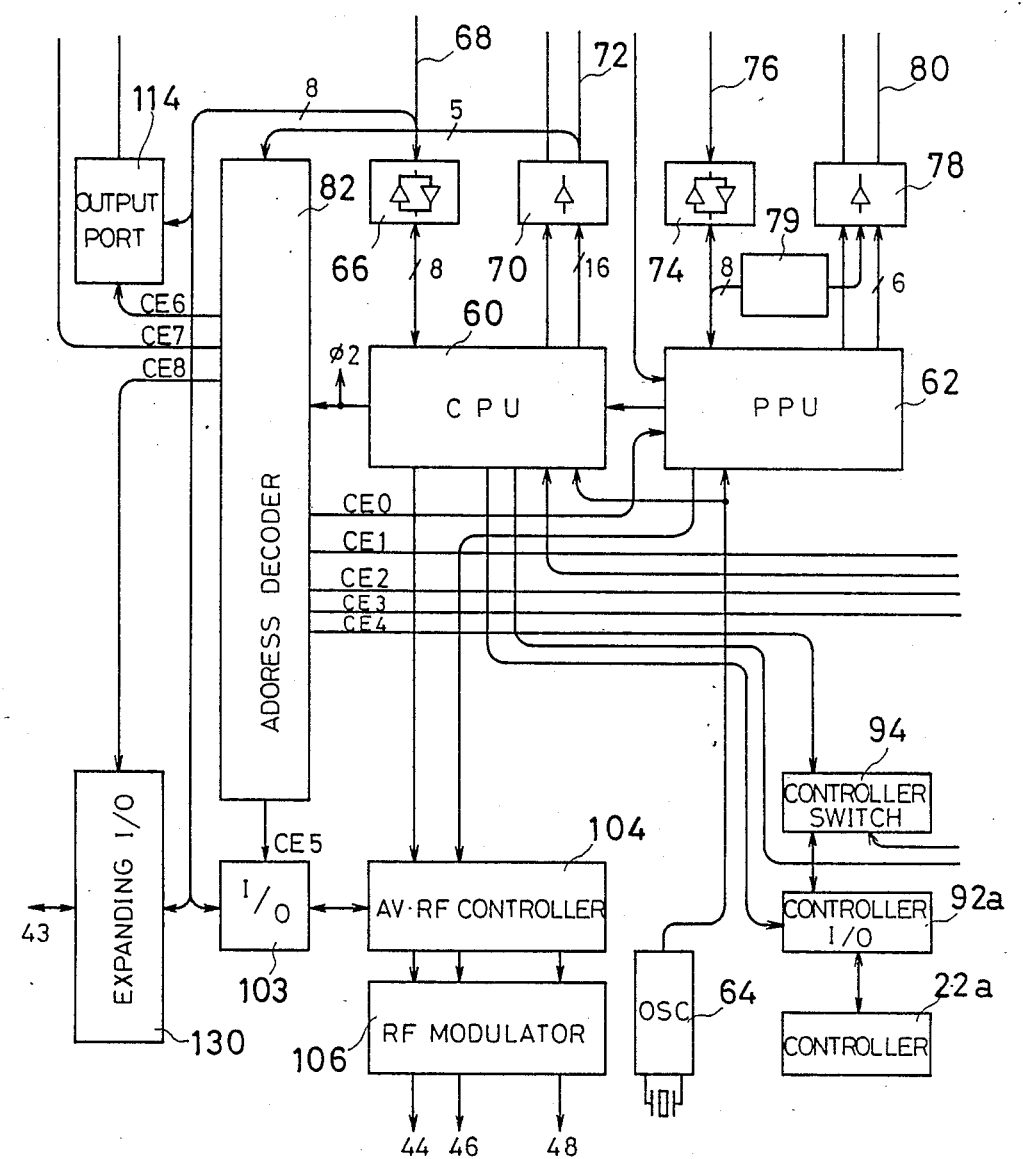
Figure 3B:
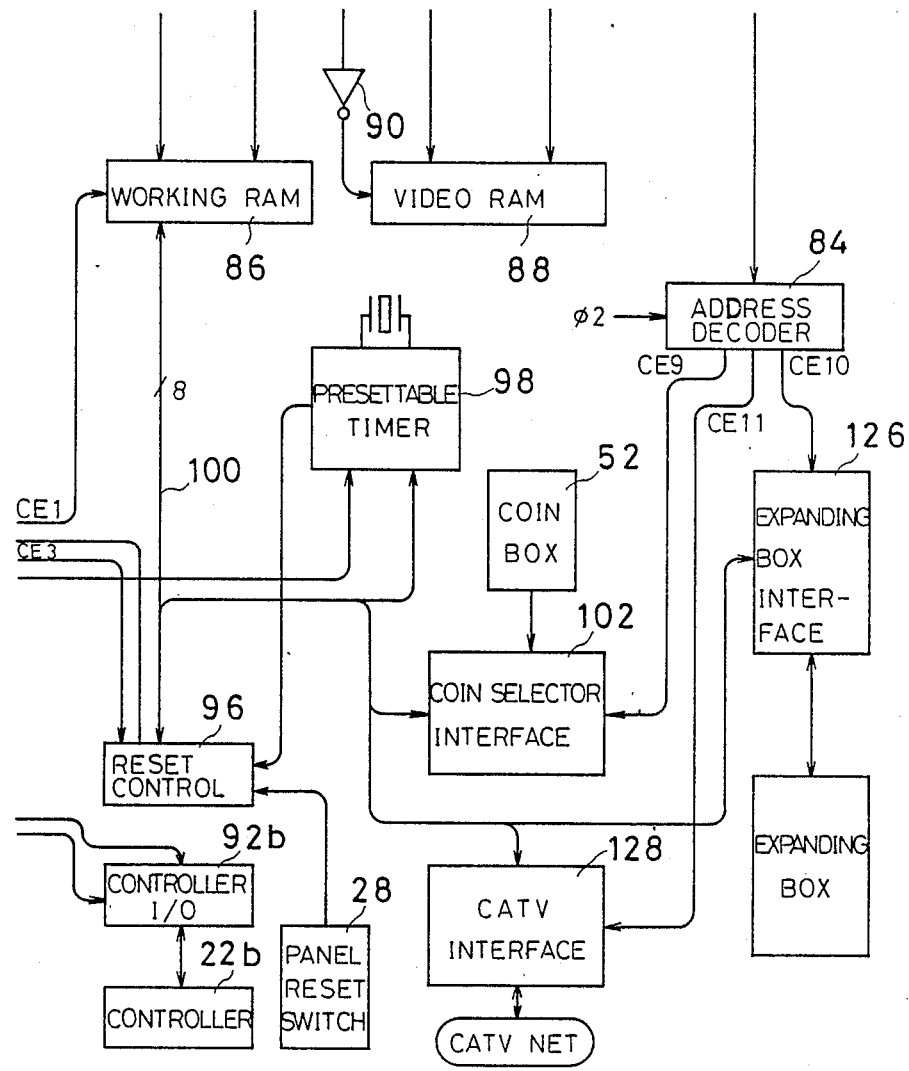

In reference to FIG. 3A and FIG. 3B, a working RAM 86 is installed in association with the CPU 60, and a video RAM 88 is installed in association with the PPU 62. The working RAM 86 is enabled by the chip enable signal CE1 from the address decoder 82, and is given the address data from the CPU 60 through the address bus 72, also being given the data from the CPU 60 through the data bus 68. To the video RAM 88, the data from the PPU 62 is given through the data bus 76 of the PPU 62, and also the address data from the PPU 62 is given through the address bus 80. The most significant bit of the address bus 80 of the PPU 62 is given as a chip enable signal of the video RAM 88 through an inverter 90. This means that the video RAM 88 is enabled when the most significant bit of the address bus 80 is "1".

In reference to FIG. 3A and FIG. 3B, the controllers 22a and 22b connected to the main unit 12 are both connected to a controller switch-over circuit 94 through I/O interfaces 92a and 92b. The controller switch-over circuit 94 is a circuit for switching to either of the controllers 22a and 22b to use it as a main controller, and in the embodiment, the controller 22a or 22b used to select the game cartridge 18 is set as such a main controller. In addition, the I/O interfaces 92a and 92b for the controllers 22a and 22b are enabled by chip enable signals from a decoder built in the CPU 60, respectively. Also, the controller switch-over circuit 94 is enabled by the chip enable signal CE4 from the address decoder 82. Then, operation signals or data from the controllers 22a and 22b are stored in the working RAM 86 through the controller switch-over circuit 94 and a reset controlling circuit 96 via a data bus 100, being utilizing for game control.

The reset switch 28 installed on the front panel 14 is connected to a reset controlling circuit 96. The reset controlling circuit 96 is connected to the controller switch-over circuit 94. When the key switch 24 is turned on, when reset switches (not illustrated) of the controllers 22a and 22b are depressed, or when a presettable timer 98 expires, the reset controlling circuit 96 outputs a reset signal to the CPU 60 in response to any signal thereof. Specifically, the reset controlling circuit 96 includes a circuit for selecting any one of various reset signals from the reset switch 28, the controller switch-over circuit 94 and the presettable timer 98 as described later and a flag for deciding the reset signal having come and storing it, and is enabled by the chip enable signal CE3 from the address decoder 82.

The presettable timer 98 is utilized as a timer for presetting the time during when the game can be played according to the amount of money of the coins put in the coin box 52, and for this purpose, the presettable timer 98 is connected to a coin selector interface 102 connected to the working RAM 86 and the coin box 52 by the eight-bit data bus 100. The coin selector interface 102 gives the kinds of the coins put in through the coin inlet 54 (FIG. 1) and the total number of each kind of coins to the working RAM 86 through the data bus 100.

The CPU 60 outputs an audio signal such as necessary effect sound responding to the progress of the game, and the audio signal is given to an AV·RF controller 104. A video signal from the PPU 62 is further given to the AV·RF controller 104, and the AV·RF controller 104 turns on or off the audio signal and the video signal given in such a manner, giving them to a RF modulator 106. The RF modulator 106 outputs composed of audio signal and video signal from the AV·RF controller 104, for example, as a television signal of the NTSC standard, that is, an RF signal. However, the audio signal and the video signal can be outputted separately as respective base band signals from the RF modulator 106. The video signal from the RF modulator 106 is outputted from the above-described video output terminal 44 as shown in FIG. 2, and the audio signal is outputted from the audio output terminal 46. Likewise, the RF signal from the RF modulator 106, that is, the television signal is outputted from the RF output terminal 48.

Figure 3C:
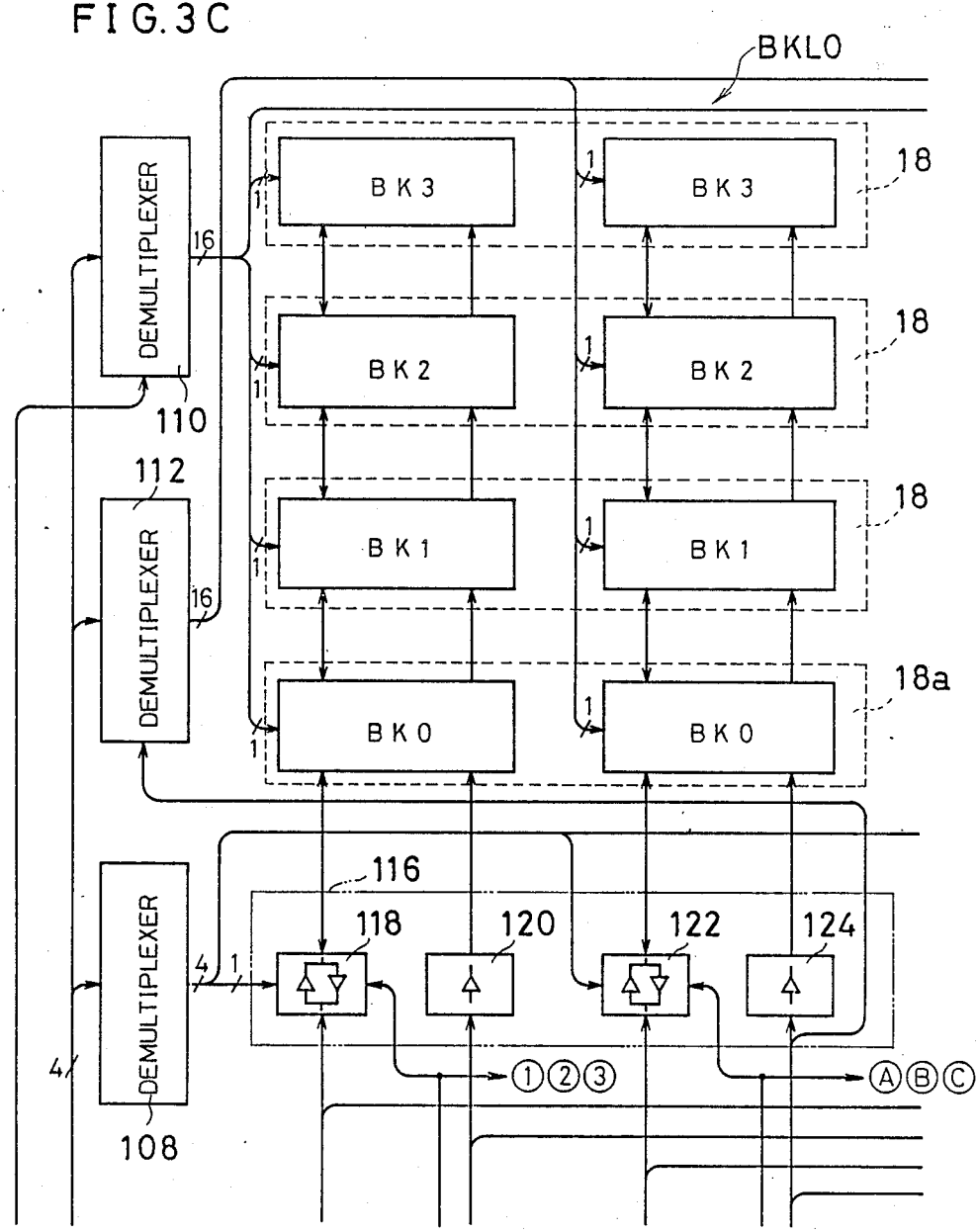
Figure 3D:
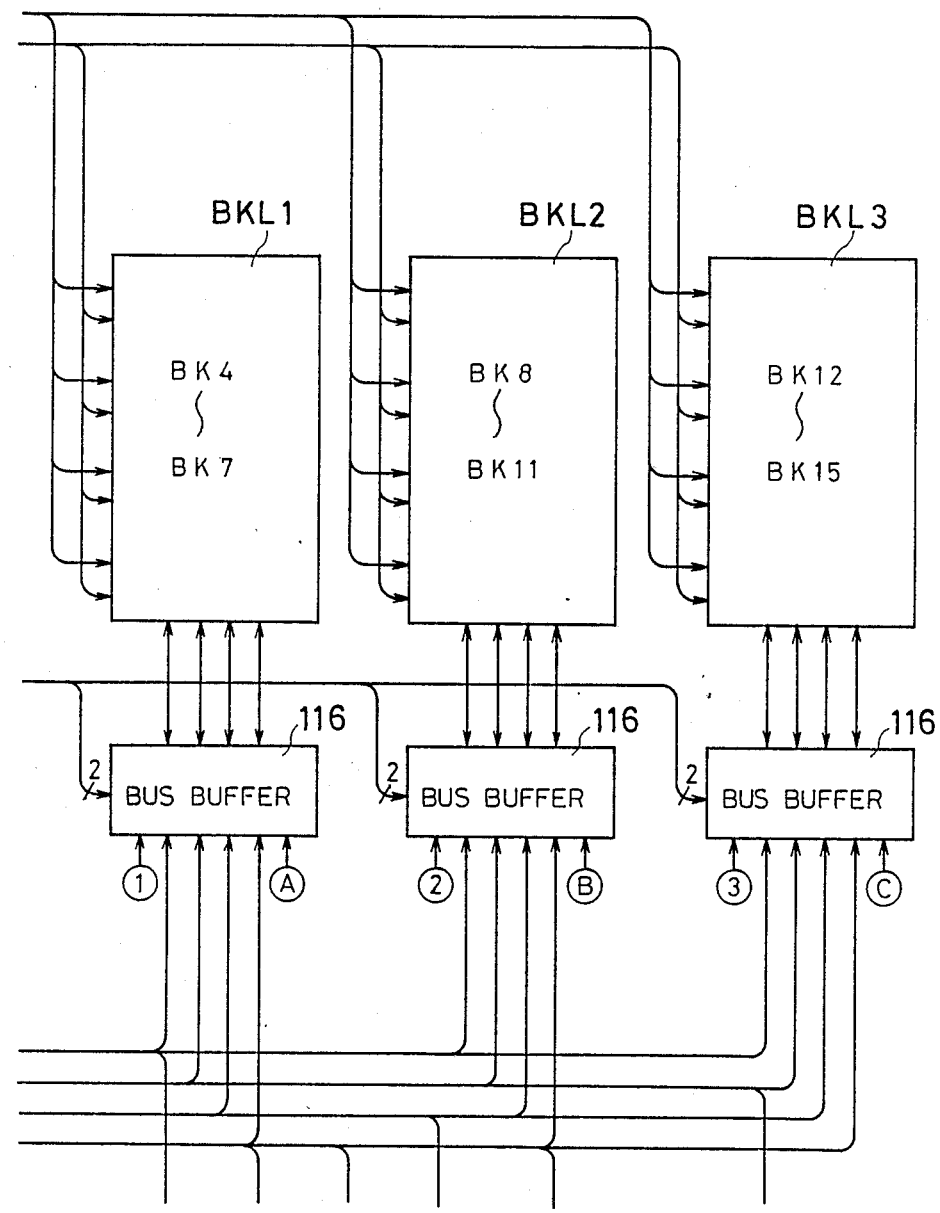

As shown in FIG. 1, a plurality of slots 16 (16 slots including a built-in slot 16a) are installed, and the game cartridge 18 is loaded in each of the slots 16. A plurality of game cartridges 18 and one monitor memory pack 18a loaded in such a manner constitutes one block by a predetermined number (four in this embodiment), and in this embodiment, since 16 slots 16 (16a) are formed, four blocks BLK0–BLK3 20 are formed. Each of the blocks BLK0–BLK3 is composed of four banks BK0–BK3, respectively. In FIG. 3C, only the block BLK0 is illustrated in detail on behalf of other blocks since they are constituted in the same manner. However, it is pointed out in advance that the blocks BLK1–BLK3 are constituted also in the same manner.

The respective banks BK0–BK3 of each of the blocks BLK0–BLK3 are connected in parallel so as to be located in an overlapped manner in the same address space when viewed from the CPU 60 and the PPU 62, but only the bank (game cartridge 18) corresponding to one game software selected by the menu mode is enabled selectively.

The program memory pack 18a loaded in one slot 16a included in the block BLK0 is allocated as the bank BK0, and the game cartridges 18 loaded in three slots 16 are allocated as the banks BK1–BK3, and each of the game cartridges, that is, the banks BK1–BK3 includes a program memory and a character memory. The blocks BLK0–BLK3 are selected by a demultiplexer 108 for selecting the block, and the program memory is selected by a demultiplexer 110 and the character memory is selected by a demultiplexer 112, respectively.

To be detailed, an eight-bit data is given to an output port 114 from the CPU 60 through the data bus 68, and the output port 114 outputs a four-bit data representing the blocks BLK0–BLK3 and the banks BK0–BK3 in accordance with the eight-bit data. The demultiplexers 108-112 decode the four-bit data given from the output port 114 in such a manner, outputting signals for selecting any one of the blocks BLK0–BLK3 and any one of the banks BK0–BK3. For example, the banks BK0–BK3 of the block BLK0 are enabled by select signals from the demultiplexers 110 and 112.

A signal from the demultiplexer 108 for specifying the block is given to a bus buffer 116 associated with the respective blocks. The bus buffer 116 includes a two-way buffer 118 for the program memory, a one-way buffer 120 for address for the program memory, a two-way buffer 122 for the character memory and a one-way buffer 124 for address for the character memory. Out of the four-bit select signal from the demultiplexer 108, two bits are given to the bus buffer 116, and one bit thereof enables the two-way buffer 118 and the other bit enables the two-way buffer 122, respectively.

In addition, the two-way buffer 118 for the program memory is connected to the data bus 68 of the CPU 60, and the two-way buffer 122 for the character memory is connected to the data bus of the PPU 62. Likewise, the one-way buffers 120 and 124 for address are connected to the address bus 72 of the CPU 60 and the address bus 80 of the PPU 62, respectively.

An expansion box interface 126 is connected to the expansion multi-pin connector 34 as shown in FIG. 1, and in this embodiment, a CATV interface 128 is installed to enable coupling with a CATV system. The expansion box interface 126 and the CATV interface 128 are enabled by the chip enable signals CE10 and CE11 from the address decoder 84, respectively.

Also, an expansion I/O port 130 is connected to an I/O connector 42c installed on the rear panel 40, and the expansion I/O port 130 is enabled by the chip enable signal CE8 from the address decoder 82.

Next, description is made on operation of this embodiment based on FIG. 4A through FIG. 6 in reference to FIG. 1 through FIG. 3.

Figure 4A:
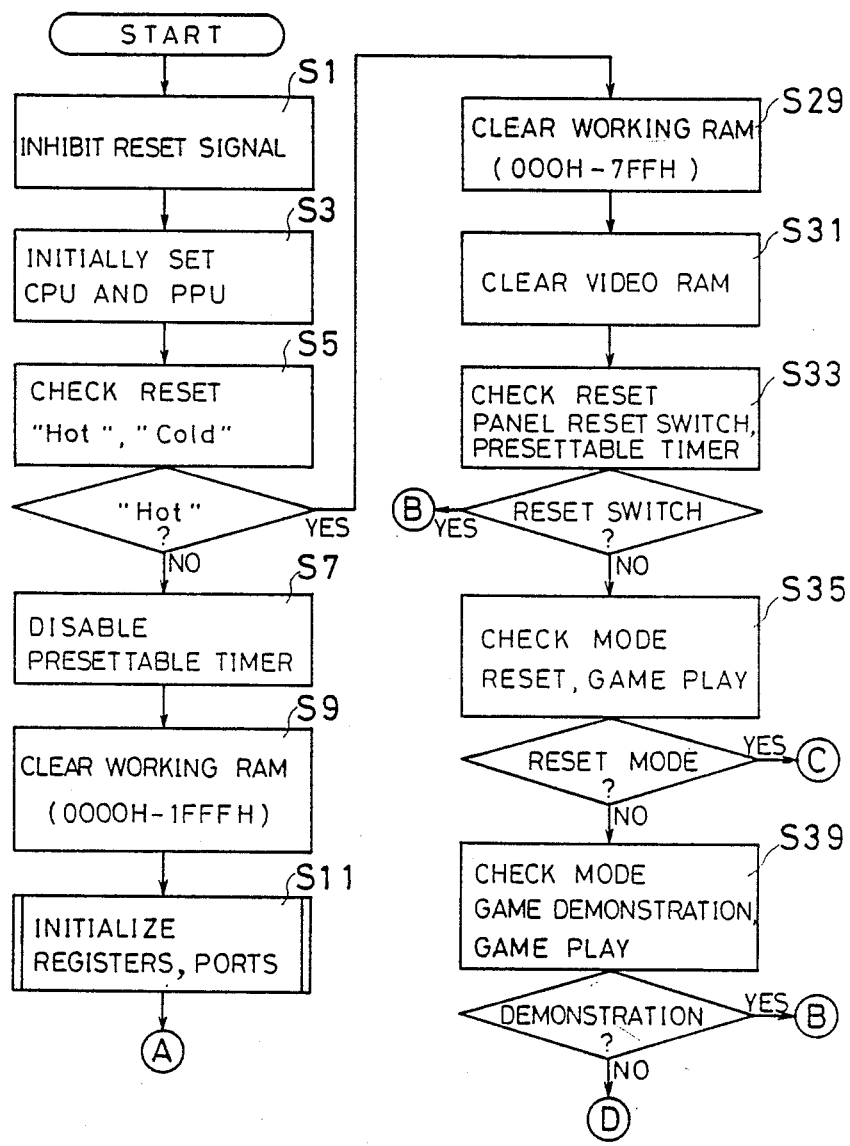
Figure 4B:
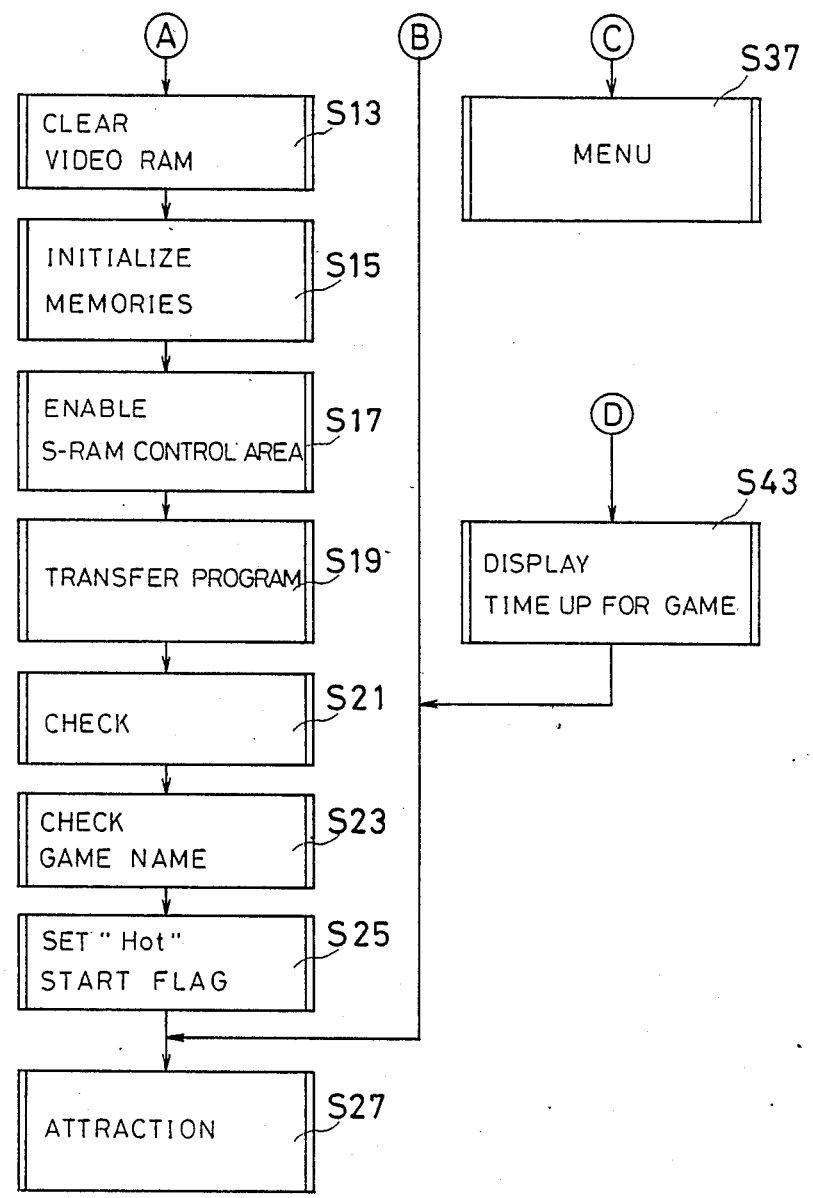

Flow charts as shown in FIG. 4A and FIG. 4B start every time a reset signal is given to the CPU 60 from the reset controlling circuit 96. This means that the reset controlling circuit 96 gives a reset signal to the CPU 60 in response to turn-on of the key switch 24 (FIG. 1) by the key 26, operation of the reset switch (not illustrated) of the controller 22a or 22b, turn-on of the reset switch 28 of the main unit, or reception of a time-up signal from the presettable timer 98. Responsively, in the first step S1, the CPU 60 outputs a signal to the address decoder 82 and sets the chip enable signal CE1 from the address decoder 82 to "0", thereby disabling the reset controlling circuit 96. Accordingly, at this point, the reset signal from the reset controlling circuit 96 is inhibited.

In the next step S3, the CPU 60 and the PPU 62 are initialized. This means that registers, ports and so on associated with the CPU 60 and PPU 62 are set to the cleared state from the unfixed state.

In the next step S5, the CPU 60 determines the kind of the triggered reset signal. The reset signals from the controllers 22a and 22b, the reset switch 28 and the presettable timer 98 are decided as the "Hot" reset, and the reset signal by turning on the key switch 24 is decided as the "Cold" reset. To decide the kind of signal in the step S5, the reset controlling circuit 96 has only to output a reset signal and a flag representing the kind of that reset signal in accordance with the kind of the signal by which the reset controlling circuit 96 is triggered.

When the "Cold" reset, that is, the reset by turn-on of the key switch 24 is detected in the step S5, the CPU 60 disables the presettable timer 98 through the address decoder 84 in the following step S7. This means that in the step S7, the CPU 60 inhibits the reset from the presettable timer 98.

Thereafter, in the step S9, the CPU 60 gives a signal to the address decoder 82, sets the chip enable signal CE1 to "1", and enables the working RAM 86, and also outputs "0" to the data bus 86 through the two-way buffer 66 to clear a predetermined area "0000H-1FFFH" of the working RAM 86. Also, in the next step S11, the CPU 60 initializes the associated registers and input/output ports.

In the step S13, the PPU 62 enables the video RAM 88 by giving data to the address bus 80 through the one-way buffer 78, and clears the video RAM 88 by outputting "0" to the data bus 76 through the two-way buffer 74.

In the step S15, the CPU 60 initializes each memory. Then, in the step S17, the CPU 60 enables an area that is part of the working RAM 86 and stores the control codes, that is, an S-RAM control area. Specifically, the CPU 60 sets the enable signal CE1 to "1" through the address decoder 82 and enables the working RAM 86, and also outputs the address for that area to the address bus 72 through the one-way buffer 70. Thereby, the S-RAM control area of the working RAM 86 is enabled.

In the following step S19, the CPU 60 transfers the program stored in the monitor memory pack 18a (FIG. 1), that is, the program of the bank BK0 to another address space. This means that since the banks BK0-BK15 as shown in FIG. 3 are all allocated to the same address space, the control program cannot be left intact together with the game cartridge 18 in the same address space, and therefore the monitor memory pack 18a of the bank BK0 is transmitted to the S-RAM control area of the working RAM 86 enabled previously.

In the step S21, the CPU 60 checks "Check-Sum" according to the program transferred to the S-RAM control area. This means that all data of the game cartridges of the banks BK1-BK15 are totaled and the totaled result is checked, and thereby decision is made on whether the game cartridges allocated to these banks BK1-BK15 are loaded or removed or whether the game cartridges are authentic or unjust. Specifically, the CPU 60 enables the output port 114 by setting the chip enable signal CE5 to "1" through the address decoder 82, and also it selects sequentially the game cartridges 18 loaded in the respective slots 16, that is, the banks BK1-BK15 by sequentially setting numeric values from "0001" to "0FFF" through the two-way buffer 66 and the data bus 68. Then, the program data and the character data from these banks BK1-BK15 are stored in the working RAM 86 through the two-way buffer 118 and the data bus 68, and the CPU 60 adds all data of the game cartridges 18, that is, the banks BK1-BK15 by accessing to that area of the working RAM 86. In this embodiment, by executing the step S21, decision can be made on whether or not a proper game cartridge is loaded in each of the slots 16 and the like.

Also, in the step S23, the game title of the game cartridge 18 loaded in each slot is checked by "Check-Sum" in the step S21. This means that if the game cartridge is registered in advance, the title of the usable game is known by the result of this "Check-Sum", and in the case of a nonregistered game cartridge, the title of the game can be decided by checking the specific code in that game cartridge.

Thereafter, in the step S25, the CPU 60 sets an "Hot" start flag formed in a predetermined area of the working RAM 86, entering an attraction mode. The attraction mode is a mode wherein information on the hotel is displayed and demonstration of the game contents set in this system is performed in a repeated manner using the TV receiver 32 (FIG. 1).

On the other hand, if decision is made to be "Hot" reset in the previous step S5, the steps S29 and S31 are executed, and thereby the predetermined area of the working RAM 86 is cleared and the video RAM 88 is cleared likewise the previous steps S9 and S13.

In the step S33, the CPU 60 decides on whether the "Hot" reset has come from the reset switch 28 on the front panel 14 or from the presettable timer 98, or whether from the controller 22a or 22b by checking the flag inputted from the reset controlling circuit 96. Then, if determination is made to be the reset signal coming from the reset switch 28 on the front panel 14, processing proceeds intact to the attraction mode as shown in the previous step S27. This means that the CPU 60 selects the bank BK0 of the block BLK0 and executes the program of the monitor memory pack 18a without fail when it is given a reset signal in a hardware fashion from the reset switch 28 or the presettable timer 98, and selects any one of banks other than the bank BK0 of the block BLK0 and executes the program of the corresponding cartridge 18 when the kind of game software is selected by the controller 22a or 22b in the menu mode as described later, and restarts execution of the program with the leading address of the game cartridge 18 selected previously when the reset switch of the controller 22a or 22b is operated.

When decision is made not to be the reset signal from the reset switch 28 on the front panel 14, in the next step S35, the CPU 60 checks the state or mode of the controller 22a or 22b. This means that the controller 22a or 22b is sometimes depressed during execution of the normal game, and is utilized also to select the game cartridge 18 loaded in each slot 16, and therefore in this step S35, the CPU 60 decides the mode where in the controller 22a or 22b has been operated, and determines the corresponding program to be executed.

In the step S35, when decision is made that the controllers 22a and 22b have been depressed in the reset mode, in the next step S37, processing proceeds to the menu mode for selecting the game cartridge.

In reverse, if the controller 22a or 22b has been operated during play of the normal game, in the step S39, the CPU 60 decides whether it has been operated during demonstration of the game or during play of the game. This can be decided easily by checking the flag set in the working RAM 86. Then, where the reset signal from the presettable timer 98 has been given during demonstration of the game, processing proceeds to the previous step S27 and the attraction mode is executed. Furthermore, where the reset signal from the presettable timer 98 has been given during play of the game, in the next step S43, expiration of the presettable timer 98 is displayed, and processing proceeds to the step S27.

In reference to FIG. 5, in the first step S101 of the attraction mode, the CPU 60 displays the attraction mode. This means that in the step S101, information on the hotel where this system is installed or the like is displayed on the screen of the monitor or TV receiver 32. This is executed by cooperation of the CPU 60 and the PPU 62. Specifically, like the Family Computer (trademark) or Nintendo Entertainment System (trademark), based on the data from the monitor memory pack 18a (FIG. 1), the audio signal is outputted from the CPU 60 and the video signal is outputted from the PPU 62. These two signals are given to the RF modulator 106 through the AV·RF controller 104. Then, the signal from the RF modulator 106 is given to the monitor, that is, television receiver 32, and thereby such a display of information can be performed.

Then, in the next step S103, the CPU 60 gives a black screen display command signal to the PPU 62 to turn off the screen of the monitor 32.

In the next step S105, likewise the step S15 in FIG. 4A, the CPU 60 enables the S-RAM control area of the working RAM 86.

Then, in the next step S107, the CPU 60 checks the next bank number, that is, the current game number by the data from the game cartridge 18 given from the data bus 68. In the next step S109, likewise the step S17 in FIG. 4A, the program of the monitor memory pack 18a is transferred to the S-RAM control area of the working RAM 86.

Thereafter, in the steps S111, S113, S115 and S117, the CPU 60 sets respective flags or data in the S-RAM control area. To be detailed, in the step S111, the CPU 60 sets the next bank number checked in the previous step S107 in the S-RAM control area. In the step S113, the CPU 60 gives data to the S-RAM control area, and sets the controllers 22a and 22b to the reset mode in the reset controlling circuit 96. In the step S115, the CPU 60 sets the flag showing that the game is being demonstrated, that is, the game demonstration flag in a predetermined region of the S-RAM control area. Then, in the step S117, the CPU 60 presets time data in the presettable timer 98 according to the amount of money of the coins put in the coin box 52, and thereafter processing enters the demonstration mode of the game. This means that processing jumps to the reset area of the game cartridge of the bank number set in the previous step S111 in the state that reset is applied by the program, and the game by that game cartridge is started.

In reference to FIG. 6, description is made on the menu display mode. In the first step S201 of this mode, a menu is displayed on the screen of the monitor 32 by cooperation of the CPU 60 and the PPU 62, and likewise the previous step S107 (FIG. 5), the next bank number, that is, the current game number is checked.

The steps S203, S205 and S207 are the same as the steps S103, S105 and S109 in FIG. 5 respectively, and here the duplicate description is omitted.

Thereafter, in the step S209, likewise the previous step S11, the number of the cartridge to be set next, that is, the bank number is set in the S-RAM control area of the working RAM 86. In the step S211, the CPU 60 sets the controllers 22a and 22b to the control mode, that is, the program mode. In the step S213, the CPU 60 sets the flag showing that the game is being played, that is, the game play flag in a predetermined area of the working RAM 86. Thereafter, in the step S215, a signal is given to the reset controlling circuit 96, and the CPU 60 allows an input of reset from the reset switch 28 on the front panel 14. Then, time of a length according to the amount of money of the coins put in the coin box 52 is preset in the presettable timer 98, and processing proceeds to the game play mode.

In addition, systems of charging money in this system conceivably include three systems; a CATV system, a key system and a coin system. In the CATV system the CPU 60 gives a signal to the address decoder 80, and enables the CATV interface 128 by setting the chip enable signal CE11 to "1". Then, a CATV network installed in the hotel or the like is coupled with this system 10. Then, the game mode is set by operating the TV/game change-over switch 30. Next, the monitor, that is, TV receiver 32 is set to a proper unoccupied channel. In this state, a game demonstration image or an operation procedure image is displayed by the attraction mode as shown in the previous FIG. 5. By operating an arbitrary key of the controller 22a or 22b, the first mode is performed, and by operating a select button (not illustrated) installed in the controller 22a or 22b in that state, the game cartridge loaded in the slot 16, that is, the game program allocated to any one of the banks BK1-BK15 is selected. Then, the start button of the controller 22a or 22b is depressed to start the game. Money has only to be charged at this point. Thereafter, on ending the game, setting is made to the TV reception mode by operating the TV/game change-over switch 30.

In the key system, the key 26 is lent out to the user at the front of the hotel where this system 10 is installed. In this case, a certain amount of money has only to be charged at this point. Thereafter, change-over is made to the game mode by operating the TV/game change-over switch 30, and the monitor, that is, TV receiver 32 is set to a proper unoccupied channel. Then, the demonstration or the operation procedure is displayed, and by inserting the key 26 lent out from the front into the key switch 24 and turning it in that state, the game is made playable. Then, likewise the previous CATV system, by utilizing the controllers 22a and 22b, selection and start of the game are performed, and after the game has ended, the TV reception mode is set by operating the TV/game change-over switch 30.

In the coin system, change-over is made to the game mode by operating the TV/game change-over switch 30, and the TV receiver 32 is set to an unoccupied channel. In this state, the user puts in a certain amount of coins through the coin inlet 54 of the coin box 52. Then, a game time is set in the presettable timer 98 according to the data of the amount of money from the coin selector interface 102 connected to the coin box 52. Then, the game cartridge is selected and the game is started by the controller 22a or 22b. Then, when the time of a length according to the amount of money of the coins put in elapses, the game is brought to an end by a time-up signal from the presettable timer 98. Thereafter, setting is made to the TV reception mode using the TV/game change-over switch 30. In the case where the coin mode as described above is utilized, it is considered also that the coin box 52 is constituted so as to be used in common as a coin timer of the existing TV receiver provided in the room of the hotel.

Furthermore, a remote control function can be constituted also using this system. For example, by using the CATV interface 128, calculation of charged money can be performed in the working area of the CPU 60 or the power supply of the system including the TV receiver 32 as a monitor can be turned on or off through the CATV line of the hotel or the like.

Also, by using the AC power line, for example, exchange of arbitrary game software data can be also performed between the front and the room.

Record data of utilization of this system are reserved in the working RAM 86 of this system, and are made accessible from the front, and thereby the amount of money of the coins put in can be made sure.

In addition, in the above-described embodiment, to facilitate exchange of the game software, the memory cartridge 18 is loaded from the outside of the main unit 12, but it may be loaded in an attachable/detachable manner in the main unit 12. Also, the menu is selected by the controller 22a or 22b, but another select switch may be installed.

Figure 7:
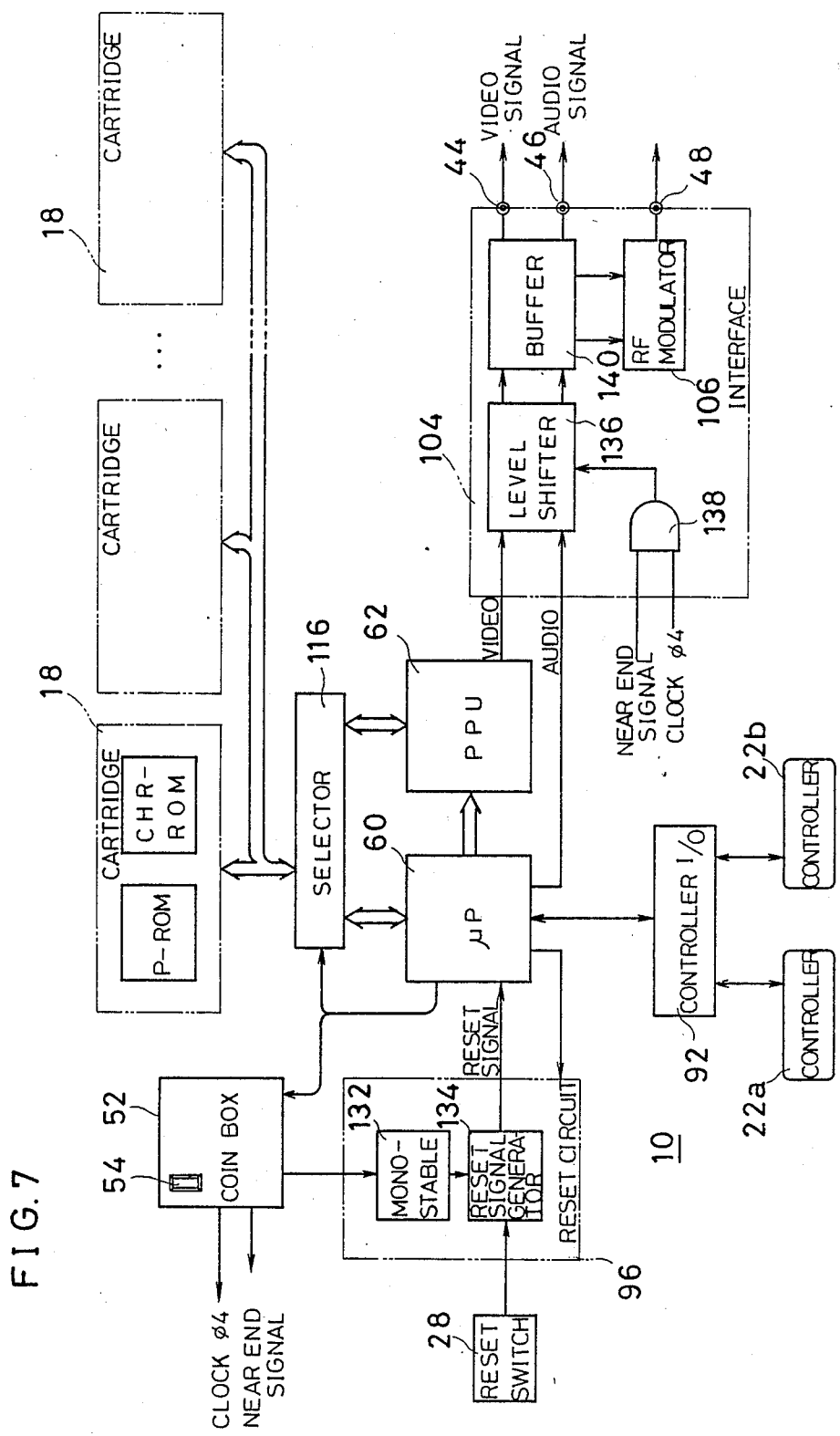
FIG. 7 is a block diagram showing portions operated by coins of the embodiment in accordance with the present invention.

FIG. 7 is a block diagram showing portions operated by coins which can be utilized for the above-described embodiment.

As described above, the $\mu$P 60 and the PPU 62 receive data from the respective ROMs of the game cartridge 18 connected selectively by the selector 116, perform proper data processing, and give the audio signal and the video signal to the interface 104, respectively.

The interface 104 includes a level shifter 136 for shifting up or shifting down the signal level, preferably the luminance level of the video signal in particular out of the video signal and the audio signal to be given. The level shifter 136 operates in response to an output from an AND gate 138. A "near end" signal and a clock $\phi 4$ from the coin box 52 are given to two inputs of AND gate 138. Accordingly, the level shifter 136 changes the luminance level of the video signal to be given in response to the period of the clock $\phi 4$ when the "near end" signal is given.

Then, the video signal and the audio signal passing through the level shifter 136 are outputted from a buffer circuit 140 through the video output terminal 44 and the audio output terminal 46. Also, a signal is given to the RF modulator 106 from the buffer circuit 140, and the RF modulator 106 modulates the video signal and the audio signal to be given into a high frequency signal or RF signal such as a television signal of the NTSC standard. The RF signal is outputted from the RF output terminal 48. The $\mu$P 60 gives a signal for directing any one to be enabled of the game cartridge 18 to the above-described selector 116, and gives a command signal for selecting the repetition frequency of the reference clock used for time counting in the coin box 52, that is, for selecting any one of clocks $\phi 1$–$\phi 3$ having different frequencies to the coin box 52. The coin box 52 outputs the above-described "near end" signal and the clock $\phi 4$, and also outputs a timer-on signal, giving them to the reset circuit 96.

A monostable multivibrator 132 which is triggered by the above-described timer-on signal given from the coin box 52 is installed in the reset circuit 96. The monostable multivibrator 132 is triggered, for example, by the trailing edge of the timer-on signal to be given, being a monostable multivibrator of so-called edge triggering type. In the reset circuit 96, a reset signal generating circuit 134 is further installed which receives an output of the monostable multivibrator 132 and an operation signal from the reset switch 28 (FIG. 2) on the front panel 14. The reset signal generating circuit 134 outputs a reset signal in response to an operation of the reset switch 28, receives an output signal from the monostable multivibrator 132, generates a reset signal, and holds it. The reset signal from the reset circuit 96, that is, the reset signal generating circuit 134 is given to the reset input of the $\mu$P 60.

In addition, the controllers 22a and 22b are connected to the $\mu$P 60 through the controller I/O 92. Then, the $\mu$P 60 gives a select signal to the selector 116 in response to an operation of either of the controller 22a and 22b, and the game can be played by operating the controllers 22a and 22b.

Figure 11:
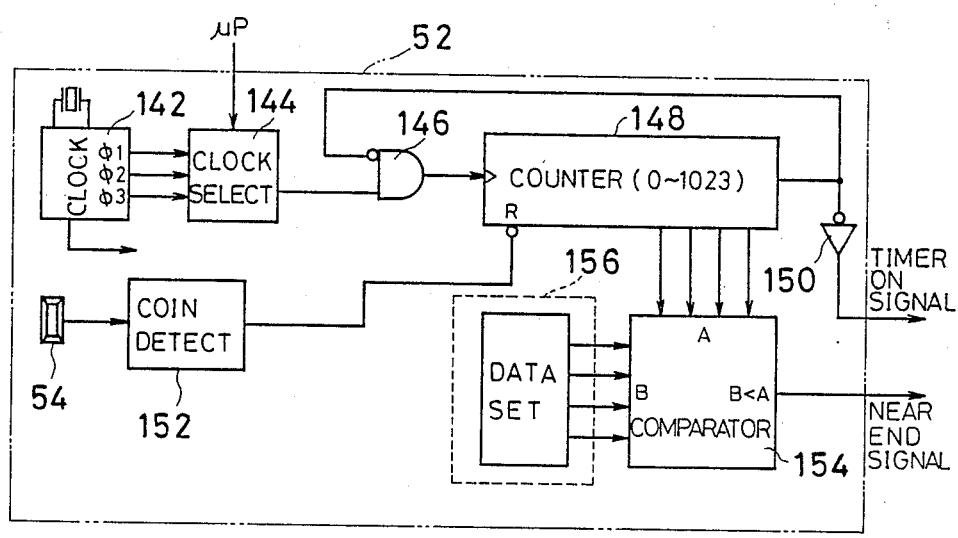
FIG. 11 is a block diagram showing one example of a coin box.

FIG. 11 shows a further detailed circuit configuration of the coin box 52. A clock generator 142 is installed in the coin box 52, and from the clock generator 142, for example, four kinds of clocks $\phi 1$, $\phi 2$, $\phi 3$ and $\phi 4$ having different repetition frequencies respectively are outputted. Then, the clocks $\phi1-\phi3$ are given to a clock selecting circuit 144, and as described above, the clock $\phi4$ is given as one input of the AND gate 138 (FIG. 7) included in the interface 104. The clock selecting circuit 144 selects any one of the three clocks $\phi1-\phi3$ to be given based on the signal from the $\mu$P 60. Selection of the clock in such a clock selecting circuit 144 can be changed by the $\mu$P 60 in accordance with the selected game cartridge. This means that in this video gaming machine, any one of three kinds of clocks is used according to the kind of game (degree of difficulty) to be played, and thereby three kinds of unit times of timer can be selected.

The selected clock from the clock selecting circuit 144 is given to a count input of a counter 148 through a two-input AND gate 146. The counter 148 is constituted, for example, as a 10-bit counter, and can count "0–1023". A carrier signal or count-up signal (outputted when 1024 is counted) from the counter 148 is inverted and given as another input of the above-described AND gate 146. The same count-up output of the counter 148 is inverted by an inverter 150, being outputted as the above-described timer-on signal. The coins (not illustrated) put in through the coin inlet 54 are detected by a coin detecting circuit 152, and a coin detection signal from the coin detecting circuit 152 is given as a reset signal of the above-described counter 148. A comparator 154 is installed, and the most significant four bits of the counted value of the counter 148 are given as one of comparison inputs A of the comparator 154. A set data from a data setter 156 including the afore-mentioned dip switch 34 (FIG. 2) is given as the other comparison input B of the comparator 154. The data set by the data setter 156 is any one of values 0–1023 counted by the counter 148, and data equivalent to a time a little shorter than the timer time of play allowed by the unit amount of money of the coins put-in is set. Accordingly, a signal from the comparator 154 is outputted as the "near end" signal for notifying in advance that the game is brought to an end after a lapse of the time according to the amount of money of the coins put in at that time.

Next, description is made on operation in such a circuit configuration.

When a certain amount of money, for example, one 100-yen coin is put in through the coin inlet 54 of the coin box 52, this is detected by the coin detecting circuit 152, and a coin detection signal as shown in FIG. 8A is outputted from the coin detecting circuit 152. In response to the coin detection signal, the counter 148 is reset, and accordingly, the count-up signal of the counter 148 becomes the low level at that point. Accordingly, the timer-on signal being the output of the inverter 150 rises to the high level at that point as shown in FIG. 8B. In response to the rise of the timer-on signal, the $\mu$P 60 is enabled, and starts processing of game information along with the PPU 62, and thereby the player can play the game on the screen of the TV receiver 32 as previously described.

On the other hand, attending on a selection of the kind of game by the player, in response to a signal outputted from the $\mu$P 60, any one of the clocks $\phi1-\phi3$ given from the clock generator 142 is selected by the clock selecting circuit 144, being given to the AND gate 146. At this time, the carrier signal or count-up signal of the counter 148 is the low level, and accordingly, a clock from the clock selecting circuit 144 is given to the counter 148 starts to count.

In due time, the counted value of the counter 148 becomes larger than the data set by the data setter 156. Then, as shown in FIG. 8C, the "near end" signal of the high level is outputted from the comparator 154 at that point. For example, assuming that a "15-minute" play can be performed by one "100-yen" coin, this "near end" signal is outputted one minute before a lapse of 15 minutes, that is, when 14 minutes have passed. However, it is needless to say that such a specific time can be set arbitrarily and differs greatly depending on the place and conditions of installation of this video gaming machine.

As shown in FIG. 7, the "near end" signal from the coin box 52 is given to the input of the AND gate 138 included in the interface 104 along with the clock $\phi4$ as shown in FIG. 8D. Accordingly, from the AND gate 138, as shown in FIG. 8E, a signal equivalent to the clock $\phi4$ is outputted while the "near end" signal is the high level, and the signal is given to the level shifter 136 as a blink signal. Accordingly, as shown in FIG. 9, this level shifter 136 shifts the luminance level of the video signal to be given. This means that the level shifter 136 keeps the luminance level of the normal game image signal when the blink signal to be given is the low level, and reduces the luminance level when the blink signal is the high level, outputting the video signal wherein the luminance level varies in synchronism with the blink signal, that is, the clock $\phi4$. This video signal is given to the buffer circuit 140. Accordingly, on the screen of the TV receiver 32, so-called blinking is produced that the luminance of display varies little by little in response to the change in the luminance level. Consequently, the player can know that the rest of the gaming time allowed by the coins put in is short by watching the screen of the TV receiver 32.

Then, if the player does not put in additional coins again, the counter counts "1024", and the count-up signal becomes the high level. Accordingly, the timer-on signal falls as shown in FIG. 8B, and the monostable multivibrator 132 included in the reset circuit 96 is triggered. Accordingly, a pulse is outputted from the monostable multivibrator 132, being given to the reset signal generating circuit 134. Accordingly, as shown in FIG. 8F, from the reset signal generating circuit 134, a reset signal is given to the $\mu$P 60 simultaneously with a count-up of the counter 148. Thereby, the $\mu$P 60 is reset and thereafter the game playing cannot be continued.

In the case where the player puts in additional coins in the coin box 52 through the coin inlet 54 when such a blink signal is outputted and blinking is performed on the screen of the TV receiver 32, as shown in FIG. 10A, the coin detection signal is obtained again from the coin detecting circuit 152. Consequently, the count-up signal of the counter 148 is forced to become the low level again at that point, and the timer-on signal from the inverter 150 keeps the high level intact. Accordingly, the monostable multivibrator 132 included in the reset circuit 96 is not triggered, and the reset signal of the $\mu$P 60 is not outputted from the reset circuit 96.

On the other hand, when an additional coin put-in signal is obtained, the counter 148 is reset again, and accordingly, the count-up signal is set to the low level. Accordingly, the clock given from the clock selecting circuit 144 continues to be given to the counter 148 intact through the AND gate 146. Since the counter 148 has been reset by the previous additional coin put-in detection signal from the coin detecting circuit 152, it starts to count again from "0", continuing the operation described previously in reference to FIG. 8A through FIG. 8F. Then, after blinking has been produced, if no coin is put in, the μP 60 is reset intact, and the game playing after that cannot be continued.

When additional coins put in are detected by the coin detecting circuit 152, as shown in FIG. 10C, the "near end" signal falls to the low level at that point. Consequently, thereafter the clock φ4 is not given to the level shifter 136 from the AND gate 138 (FIG. 7), and the shifting operation of the luminance level by the level shifter 136 is stopped. This means that in response to an additional put-in of coils, blinking on the screen of the TV receiver 32 is stopped.

Figure 12:
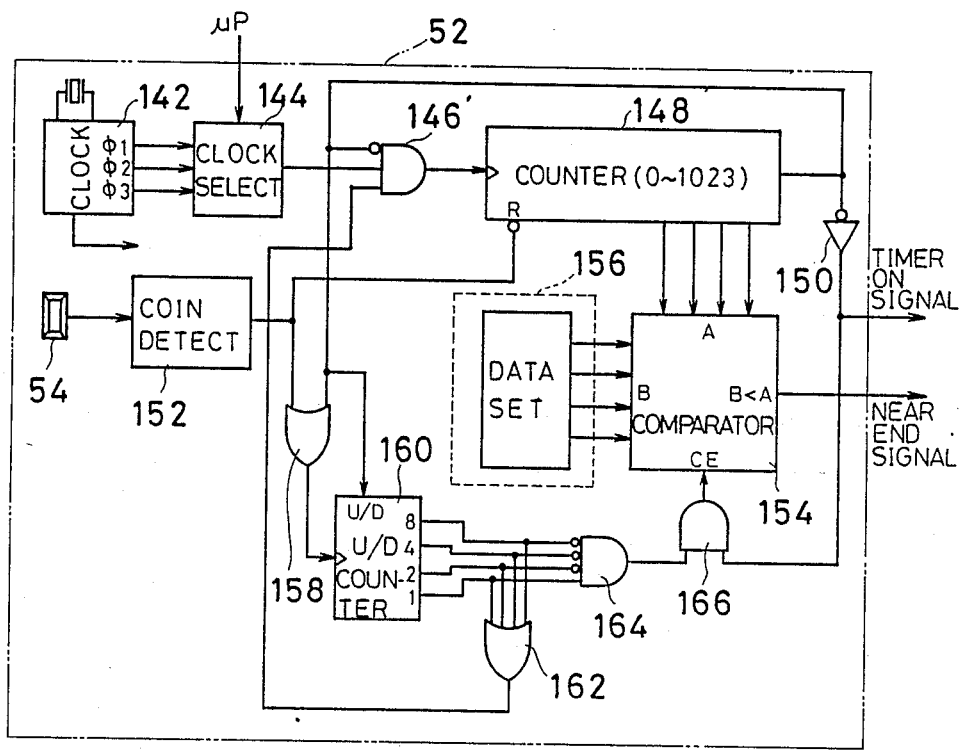
FIG. 12 is a block diagram showing another example of the coin box.

In the above-described embodiment in FIG. 11, even if coins are put in continuously before game playing is started, they are not counted, and therefore virtually continuous put-in is not accepted. Then, another embodiment as shown in FIG. 12 is proposed. In the embodiment in FIG. 12, the continuous put-in of coins before starting playing the game is accepted.

In FIG. 12, portions the same as or similar to those in FIG. 11 are designated by the same or similar reference symbols, and thereby the duplicate description is omitted.

In the embodiment in FIG. 12, the two-input AND gate 146 (FIG. 11) receiving the clock from the clock selecting circuit 144 is changed to a three-input AND gate 146'. Then, the output signal from the coin detecting circuit 152 is given as one of inputs of an OR gate 158. To the other input of the OR gate 158, the count-up signal from the counter 148 is given, and the output of the OR gate 158 is given as a count input of an up-down (U/D) counter 160. As an U/D input for directing either of count-up and count-down in the U/D counter 160, a count-up signal of the counter 148 is given intact. Then, the U/D counter 160 counts down according to a signal or pulse from the OR gate 158 when the U/D input to be given is the high level. In reverse, the U/D counter 160 is put in the count-up mode when the U/D input is the low level. The U/D counter 160 is constituted, for example, as a four-bit counter, and all four-bit outputs from the U/D counter 160 are given to a four-input OR gate 162. Accordingly, the high level signal is outputted from the OR gate 162 only when the counted value of the U/D counter 160 is not "0". An output of the OR gate 162 is given as a residual input of the above-described AND gate 146'. Accordingly, the counter 148 can receive the clock from the clock selecting circuit 144 as a count input thereof through the AND gate 146' when the residual number of coins put-in is other than "0".

The four-bit outputs of the U/D counter 160 are also given as respective inputs of a four-input AND gate 164. This means that only the least significant bit of the U/D counter 160 is kept intact and the most significant three bits are inverted, becoming respective inputs of the AND gate 164. Accordingly, a high level signal is outputted from the AND gate 164 only when the counted value of the U/D counter 160 is "1".

Then, an output of the AND gate 164 is given as an input of a two-input AND gate 166 along with the above-described inverter 150. An output of the AND gate 166 is given as the enable signal CE of the comparator 154. Accordingly, the comparator 154 is enabled only when the timer-on signal is the high level and the counted value of the U/D counter 160 is "1", that is, only when the residual number of coins put in becomes 1.

Description is made on the operation in the case where coins are put in continuously. When coins are put in, one pulse is outputted from the coin detecting circuit 152 every time a coin is put in. The coin detecting signal from the coin detecting circuit 152 is given to the count input of the U/D counter 160 through the OR gate 158. At this time, the counter 148 is reset by the coin put-in signal, and therefore the count-up signal thereof is the low level, and a low-level signal is given to the U/D input of the U/D counter 160, and accordingly, the U/D counter 160 is put in the count-up mode. Consequently, when one coin detection signal is given, the U/D counter 160 is incremented by "1", and resultingly the U/D counter 160 counts the number of the coins put in through the coin inlet 54.

When the U/D counter 160 counts the number of the coins put in, the output of the OR gate 162 becomes the high level at this point, and thereby the AND gate 146' is enabled, and the clock from the clock selecting circuit 144 is given as a count input of the counter 148. Thereby, the counter 148 starts to count. When the U/D counter 160 counts "2" or more, the output of the AND gate 164 is low, and accordingly at this time the comparator 154 is disabled by the output of the AND gate 166. This means that even if the timer-on signal from the inverter 150 is the high level, the counted value of the U/D counter 160 becomes "2" or more and the output of the AND gate 164 becomes the low level, and therefore, the output of the AND gate 166 becomes the low level and the comparator 154 is not enabled.

On the other hand, since the counted value of the U/D counter 160 is not "0", thereafter a high level signal is outputted from the OR gate 162. Accordingly, the clock from the clock selecting circuit 144 is given to the count input of the counter 148 through the AND gate 146'. Then, when a time equivalent to one coin put in elapses, that is, when the counter 148 counts "1024", the counter 148 outputs a count-up signal of the high level, and thereby the U/D counter 160 is put in the count-down mode, and in response to that signal, the U/D counter 160 counts "−1". This means that the U/D counter 160 is decremented by "1" from the number of the coins put in counted initially every time the time equivalent to one coin elapses.

When the residual number of coins becomes "1", the four-bit inputs to the AND gate 164 given from the U/D counter 160 become all "1", and accordingly the comparator 154 is enabled at that point.

Thereafter, attending on the progress of count by the counter 148, operations like ones as described early in FIG. 8A through FIG. 8F or FIG. 10A through FIG. 10F are performed. Thus, the player can enjoy the game for a time according to the number of the coins put in before starting playing the game. This means that the U/D counter 160 counts the number of coins continuously put in initially, and when the counted value is counted down to "1", the comparator 154 is enabled for the first time at that point, and therefore till then the "near end" signal is not outputted even if the counted value of the counter 148 exceeds the value set by the data setter 156. For that reason, during that period of time, no blinking is produced on the screen of the TV receiver 32, and the player can enjoy the game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game software service system connected to a monitor to display an image for games to be played on the monitor, comprising:
a plurality of game memory means, each memory means for storing at least one game program, said plurality of game memory mean being divided into a plurality of blocks;
a plurality of bus buffer means for buffering information for said plurality of game memory means, a respective one of said bus buffer means being connected to a corresponding one of said plurality of blocks;
first operation means by which a game can be played by a player;
processing means, coupled to said first operation means, for processing a game program in accordance with the operation of said first operation means, said processing means being connected to respective ones of said plurality of bus buffer means through a common address bus and a common data bus;
each of said bus buffer means for buffering information for said plurality of game memory means includes a bidirectional data buffer means connected to the said common data bus and an address buffer means connected to the said common address bus;
second operation means by which the player is able to select any one of said plurality of game memory means by inputting selection information;
said processing means including means responsive to said selection information for generating block selecting data, and for generating bus buffer means selecting data;
block selecting means for selecting a block from said plurality of blocks based upon said block selecting data generated by said processing means in accordance with said selection information, whereby the block is enabled to permit the execution of a game program stored in an identified game memory means; and
bus buffer selecting means for selecting a bus buffer means of said plurality of bus buffer means based upon said bus buffer means selecting data which is generated by said processing means in accordance with said selection information, whereby the game program stored in the game memory means included in the selected block can be accessed by said processing means through the common address bus and the common data bus, and the selected bus buffer means.

2. A game software service system connected to a monitor to display an image for games to be played on the monitor, comprising:
a plurality of game memory means, each memory means for storing at least one game program, said plurality of game memory means being divided into a plurality of blocks, said plurality of blocks being connected to a respective set of data lines and address lines;
a plurality of first bidirectional buffer means, respective ones of which are connected between respective ones of said data lines and a common data bus;
a plurality of second buffer means, respective ones of which are connected between respective ones of said address lines and a common address bus;
first operation means by which a game can be played by a player;
processing means coupled to said first operation means for processing a game program in accordance with the operation of said first operation means, said processing means being connected to respective ones of said pluralities of first and second buffer means through said common address bus and said common data bus;
second operation means by which the player is able to select any one of said plurality of game memory means by inputting selection information;
said processing means including means responsive to said selection information for generating block selecting data, game memory means selecting data and buffer means selecting data;
block selecting means for selecting a block from said plurality of blocks based upon said block selecting data generated by said processing means in accordance with said selection information;
game memory means selecting means for selecting a game memory means from said plurality of game memory means included in a selected block based upon said game memory means selecting data generated by said processing means in accordance with said selection information, whereby a selected game memory means is enabled to permit the execution of a game program stored therein; and
buffer selecting means for selecting a first buffer means of said plurality of first buffer means and a second buffer means of said plurality of second buffer means based upon said buffer means selecting data which is generated by said processing means in accordance with said selection information inputted by the player, whereby said processing means can read the game program stored in the game memory means included in the selected block through said common data bus and the selected first bus buffer means while the addresses of said game program are addressed by said processing means through said common address bus and the selected second bus buffer means.

3. A game software service system in accordance with claim 2 further comprising reset means for generating a reset signal, wherein said processing means includes a control program and wherein said processing means branches from any game program being executed and executes said control program each time when the reset signal is applied from said reset means.

4. A game software service system in accordance with claim 3, wherein said reset means includes first means for generating a first reset signal and second means for generating a second reset signal,
said processing means executes said control program in response to said first reset signal so that a menu by which the player can select one of said game memory means is displayed on said monitor, and executes a game program of a selected game memory means in response to the second reset signal.

5. A game software service system in accordance with claim 2, wherein each of said game memory means includes character memory means for storing character data for a game and program memory means for storing program data for controlling said game, and wherein said processing means includes a first processing means which accesses said program memory via the selected bus buffer means and a second processing means which accesses said character memory via the same selected bus buffer means.

6. A game software service system in accordance with claim 2, wherein said plurality of memory means are pluggably detachable.

7. A game software service system in accordance with claim 2, wherein said first operating means includes said second operating means.

8. A game software service system in accordance with claim 2, further comprising:
   a housing,
   a valuable medium insertion means for receiving a valuable medium provided in association with said housing,
   detecting means for detecting if a valuable medium has been inserted in said valuable medium insertion means,
   timer means for counting a time related to the value of the valuable medium detected by said detecting means, and
   changing means responsive to said timer means and said processing means for changing a level of luminance of a screen of said monitor when a predetermined remaining time is identified by said timer means.

9. A game software service system in accordance with claim 8, further comprising stop means for stopping changing of the level of the luminance of said monitor by said changing means when a further valuable medium is inserted in said valuable medium insertion portion when said changing means is operating.

10. A game software service system in accordance with claim 8, wherein said changing means includes means for changing a luminance level of a game image signal in accordance with a periodic signal.

11. A game software service system in accordance with claim 8, wherein said valuable medium includes coins and said detecting means includes a coin selector.

12. A game software service system in accordance with claim 2, further including monitor memory means connected to said processing means by way of said first and second buffer means.

13. A game software service system in accordance with claim 2, wherein said processing means includes means for generating memory selecting data, and said block selecting means includes means for selectively enabling one of said plurality of game memory means based upon said memory selecting data.

14. A coin-operated game software service system connected to a monitor to display an image for games to be played on the monitor, comprising:
   a plurality of game memory means, each memory means for storing at least one game program, said plurality of game memory means being divided into a plurality of blocks;
   a plurality of bus buffer means for buffering information for said plurality of game memory means, a respective one of said bus buffer means being connected to a corresponding one of said plurality of blocks;
   first operation means by which a game can be played by a player;
   processing means, coupled to said first operation means, for processing a game program in accordance with the operation of said first operation means, said processing means being connected to respective ones of said plurality of bus buffer means through a common address bus and a common data bus;
   second operation means by which the player is able to select any one of said plurality of game memory means by inputting selection information;
   said processing means including means responsive to said selection information for generating block selecting data, and for generating bus buffer means selecting data;
   block selecting means for selecting a block from said plurality of blocks based upon said block selecting data generated by said processing means in accordance with said selection information, whereby the block is enabled to permit the execution of a game program stored in an identified game memory means;
   bus buffer selecting means for selecting a bus buffer means of said plurality of bus buffer means based upon said bus buffer means selecting data which is generated by said processing means in accordance with said selection information, whereby the gate program stored in the game memory means included in the selected block can be accessed by said processing means through the common address bus and the common data bus, and the selected bus buffer means; and
   a valuable medium insertion means for receiving a valuable medium,
   detecting means for detecting if a valuable medium has been inserted in said valuable medium insertion means,
   displaying means for displaying an image for a game on a screen when the insertion of a valuable medium is detected by said detecting means,
   timer means for counting a time related to the value of the valuable medium detected by said detecting means, and
   changing means responsive to said timer means and said processing means for changing a level of luminance of a screen of said monitor when a predetermined remaining time is identified by said timer means.

* * * * *